(12) United States Patent
Takagi et al.

(10) Patent No.: US 10,911,702 B2
(45) Date of Patent: Feb. 2, 2021

(54) IMAGING DEVICE AND IMAGING APPARATUS

(71) Applicant: CANON KABUSHIKI KAISHA, Tokyo (JP)

(72) Inventors: Akinari Takagi, Yokosuka (JP); Shin Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/685,830

(22) Filed: Nov. 15, 2019

(65) Prior Publication Data

US 2020/0084402 A1    Mar. 12, 2020

Related U.S. Application Data

(63) Continuation of application No. PCT/JP2018/020044, filed on May 24, 2018.

(30) Foreign Application Priority Data

May 31, 2017 (JP) ................................ 2017-108272

(51) Int. Cl.
| | |
|---|---|
| H04N 5/369 | (2011.01) |
| H04N 9/04 | (2006.01) |
| G05D 1/02 | (2020.01) |
| H04N 9/07 | (2006.01) |

(52) U.S. Cl.
CPC ....... *H04N 5/36965* (2018.08); *G05D 1/0238* (2013.01); *G05D 1/0251* (2013.01); *H04N 9/0455* (2018.08); *H04N 9/07* (2013.01)

(58) Field of Classification Search
None
See application file for complete search history.

(56) References Cited

U.S. PATENT DOCUMENTS

| | | | |
|---|---|---|---|
| 8,964,098 B2 * | 2/2015 | Aoki .................... | H04N 5/3532 348/345 |
| 2014/0055575 A1 * | 2/2014 | Imamura .......... | H01L 27/14625 348/49 |
| 2018/0120423 A1 * | 5/2018 | Nishikawa ............... | G01C 3/08 |

(Continued)

FOREIGN PATENT DOCUMENTS

| | | |
|---|---|---|
| JP | 5504874 B2 | 5/2014 |
| JP | 2015-203756 A | 11/2015 |
| JP | 2017-163539 A | 9/2017 |

(Continued)

*Primary Examiner* — Heather R Jones
(74) *Attorney, Agent, or Firm* — Canon U.S.A., Inc. IP Division

(57) ABSTRACT

An imaging device according to the present invention includes multiple pixels arranged in a row direction and a column direction, which are orthogonal to each other. The multiple pixels include distance measurement pixels each including multiple photo-electric converters arranged so as to be adjacent to each other in the row direction. When M and N denote integers not smaller than one, the pixels are arranged at positions shifted in the row direction for every M-number rows by an amount corresponding to a half of the pixel, color filters are arranged in the row direction in an array of N-number columns per cycle, and the color filters are arranged in the column direction in an array of 2MN-number rows per cycle.

17 Claims, 11 Drawing Sheets

(56) References Cited

U.S. PATENT DOCUMENTS

2018/0352182 A1* 12/2018 Takahashi .......... H04N 9/04555
2020/0058694 A1* 2/2020 Nakanishi ......... H01L 27/14627

FOREIGN PATENT DOCUMENTS

| JP | 2017-168971 A | 9/2017 | |
|----|---------------|--------|---|
| WO | 2012/132827 A1 | 10/2012 | |
| WO | WO-2012132827 A1 * | 10/2012 | ........... H04N 5/2329 |
| WO | WO-2017006546 A1 * | 1/2017 | ............. G01S 17/10 |

* cited by examiner

16 ROWS PER CYCLE

EIGHT ROWS PER CYCLE

IMAGING DEVICE AND IMAGING APPARATUS

CROSS-REFERENCE TO RELATED APPLICATIONS

This application is a Continuation of International Patent Application No. PCT/JP2018/020044, filed May 24, 2018, which claims the benefit of Japanese Patent Application No. 2017-108272, filed May 31, 2017, both of which are hereby incorporated by reference herein in their entirety.

TECHNICAL FIELD

The present invention relates to imaging devices and imaging apparatuses. In particular, the present invention relates to an imaging device and an imaging apparatus that measure a distance using an imaging plane phase difference method.

BACKGROUND ART

In installation of an imaging apparatus using an imaging device, such as a complementary metal oxide semiconductor (CMOS) sensor or a charge coupled device (CCD) sensor, in a robot or an automobile, a function to acquire distance information with respect to a related object is required, in addition to a function to acquire image information. A method called an imaging plane phase difference method is proposed as a method of acquiring the distance information with the image information (PTL 1).

In the imaging plane phase difference method, the distance information is acquired from the parallax (the amount of image shift) of a parallax image generated from light beams that have passed through different areas (pupil areas) of a lens pupil. Here, the distance measurement accuracy in the imaging plane phase difference method is determined by the base line length and detection resolution of the parallax if the imaging magnification of an imaging optical system is constant. The detection resolution of the parallax is determined by the pixel size of the imaging device and is improved as the pixel size is decreased. Accordingly, decreasing the pixel size achieves the high distance measurement accuracy to provide the accurate distance information.

CITATION LIST

Patent Literature

PTL 1: Japanese Patent No. 5504874

However, decreasing the pixel size causes a problem in that the amount of light incident on the pixels is decreased to reduce the sensitivity. In addition, there is a challenge of non-optimization of color reproduction in the acquired image information due to an increase in the amount of noise caused by the reduction in the sensitivity. In particular, it is necessary to improve the accuracy of not only the distance information but also image recognition in order to perform collision avoidance in moving and acquisition of a target object with high accuracy. It is also necessary to acquire higher quality image information.

It is an object of the present invention to provide an imaging device and an imaging apparatus capable of acquiring high-sensitivity and high-accuracy distance information and high-quality image information.

SUMMARY OF INVENTION

An imaging device according to the present invention includes multiple pixels arranged in a row direction and a column direction, which are orthogonal to each other. The multiple pixels include distance measurement pixels each including multiple photo-electric converters arranged so as to be adjacent to each other in the row direction. When M denotes an integer not smaller than one and N denotes an integer not smaller than two, the pixels are arranged at positions shifted in the row direction for every M-number rows by an amount corresponding to a half of the pixel, color filters are arranged in the row direction in an array of N-number columns per cycle, and the color filters are arranged in the column direction in an array of 2MN-number rows per cycle.

Further features of the present invention will become apparent from the following description of exemplary embodiments with reference to the attached drawings.

BRIEF DESCRIPTION OF DRAWINGS

FIG. 6C is a diagram concerning the arrangement of the color filters in the imaging device according to the second embodiment.

FIG. 6D is a diagram concerning the arrangement of the color filters in the imaging device according to the second embodiment.

DESCRIPTION OF EMBODIMENTS

Figure 1A:
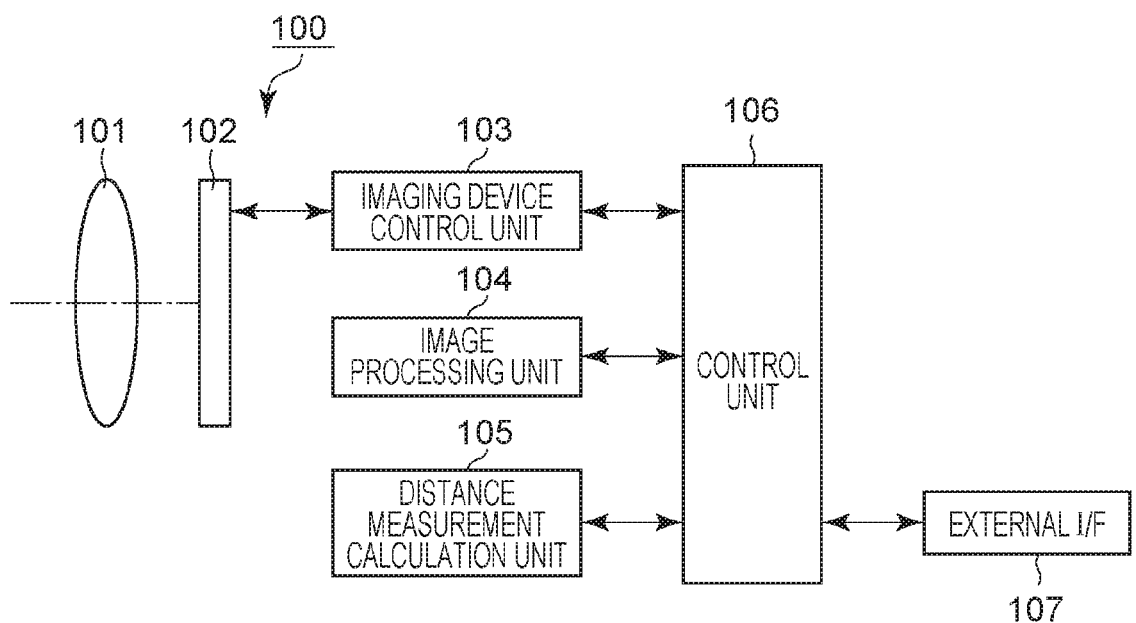
FIG. 1A is a functional block diagram of an imaging apparatus and an imaging device according to embodiments.

Imaging apparatuses in embodiments of the present invention will herein be described with reference to the drawings. The same reference numerals are used in all the drawings to identify the components having the same functions and a duplicated description of such components is omitted herein.

First Embodiment

An exemplary configuration of an imaging apparatus using an imaging device according to the present invention is illustrated in FIG. 1. Referring to FIG. 1A, an imaging apparatus 100 includes an imaging optical system 101, an imaging device 102, an imaging device control unit 103, an image processing unit 104, a distance measurement calculation unit 105, a control unit 106, an external interface (I/F) 107, and so on. An optical image of a subject field to be captured is formed on the imaging device 102 by the imaging optical system 101. The imaging optical system 101 of the present embodiment has a focusing mechanism to change the focal position, an aperture mechanism to adjust the amount of transmitted light, an amount-of-light adjusting mechanism to insert and remove an optical filter, such as a neutral density (ND) filter, a zooming mechanism to change the focal distance, and so on. The imaging optical system 101 may be configured so as to be removable from the imaging apparatus 100. In this case, communication means for communicating a variety of data, such as control information and setup information, between the imaging optical system 101 and the imaging apparatus 100 is preferably provided.

The imaging device 102 has a function to convert the optical image formed by the imaging optical system 101 into an electrical signal and is capable of outputting a pixel signal including an imaging signal for generating a captured image and a distance detection signal for detecting distance information about a subject. A detailed structure, the operation, and so on of the imaging device 102 will be described in detail below.

The imaging device control unit 103 drives the imaging device 102, reads out the pixel signal corresponding to the optical image output from each pixel, and transfers the pixel signal to the control unit 106. In addition, the imaging device control unit 103 includes correcting means for appropriately correcting the pixel signal. For example, the correcting means includes a process to correct the reduction in the amount of light in a peripheral area of the imaging device 102, an interpolation process in a defect of the pixel signal, and so on.

The image processing unit 104 performs development in units of frames based on the imaging signal included in the pixel signal transferred to the control unit 106 to generate the captured image. The captured image is not limited to a still image and may be a moving image or the like using a certain encoding method, such as H.265. The captured image may not be generated in units of frames and the captured image corresponding to one frame may be generated using the imaging signal concerning multiple frame images. In addition, the distance detection signal may also be used in the generation of the captured image.

The distance measurement calculation unit 105 calculates the distance information about the subject based on the distance detection signal included in the pixel signal transferred to the control unit 106. The distance information may be calculated for each pixel or for each specific area. The imaging signal may also be used, in addition to the distance detection signal, in the calculation of the distance information.

Reference numeral 106 denotes the control unit to control the entire imaging apparatus 100. The control unit 106 includes a central processing unit (CPU) that controls various calculations and the entire imaging apparatus 100. The CPU performs overall control of the respective components in order to control the entire imaging apparatus 100. In addition to this control, the CPU performs setting of various setup parameters and so on to the respective components. In addition, the CPU includes a cache memory or the like, which is capable of electrically writing and erasing data, and executes programs recorded on the cache memory or the like. The memory is used as, for example, a storage area of the programs executed by the CPU, a working area during execution of the programs, and a data storage area. The control unit 106 also performs analysis and image processing of a signal output from the imaging device 102. The result of analysis is output as image information. The image information is the result of analysis of an image and includes not only the luminance and the color of the subject but also the presence and the features of an object (including a human body), the position, the speed, and the acceleration of the object, the result of detection of a specific subject, and so on.

The captured image generated in the image processing unit 104 is supplied to a display unit or the like, such as a liquid crystal display (LCD) (not illustrated). In addition, the control unit 106 calculates an appropriate amount of exposure condition from the pixel signal to control the aperture and the ND filter in the imaging optical system 101, the shutter speed in the imaging device 102, and the value of gain used in the imaging device control unit 103. The shutter speed here corresponds to the exposure time by an electronic shutter. The control unit 106 instructs the imaging device 102 of a timing to start accumulation of an electric charge, a timing to read out the electric charge, and so on in synchronization with a certain synchronization signal to perform the control of the respective components. Furthermore, the control unit 106 also includes a random access memory (RAM) that temporarily stores the result of calculation and an output signal from the imaging device control unit 103 and a read only memory (ROM) that stores defect pixel data and various adjustment values or parameters.

Reference numeral 107 denotes the external I/F, which externally outputs the captured image, the calculated distance measurement information, and so on. The output destination includes an external control apparatus, a recorder, an external analysis apparatus (an image recognition apparatus or the like), and so on. A variety of data, the image signal, and so on are capable of being received from an external apparatus, such as another imaging apparatus, through the external I/F 107. Alternatively, the imaging apparatus 100 may connect with an external computer using the external I/F 107 over a computer or the Internet to acquire necessary information. The external I/F 107 is not limited to wired connection and may be wireless connection conforming to a certain standard, such as a wireless local area network (LAN).

Figure 1B:
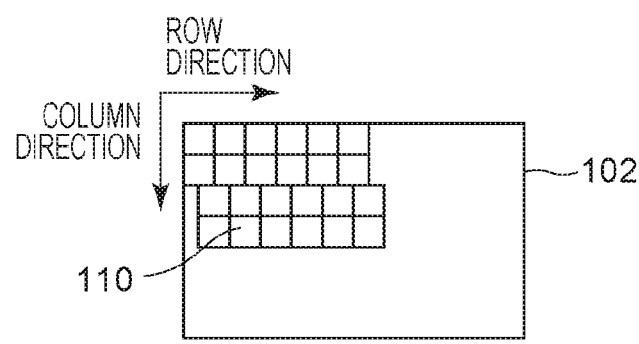
FIG. 1B is a functional block diagram of the imaging apparatus and the imaging device according to the embodiments.
Figure 1C:
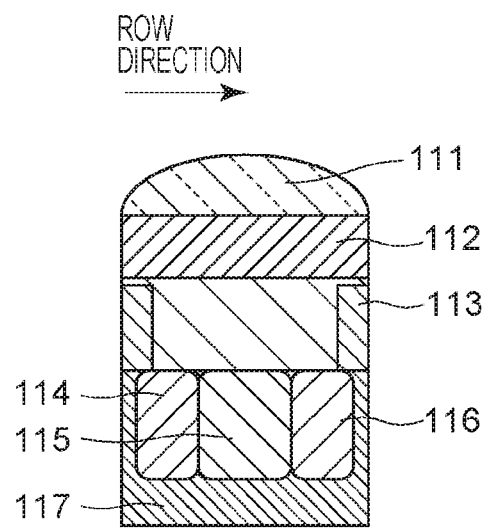
FIG. 1C is a functional block diagram of the imaging apparatus and the imaging device according to the embodiments.
Figure 1D:
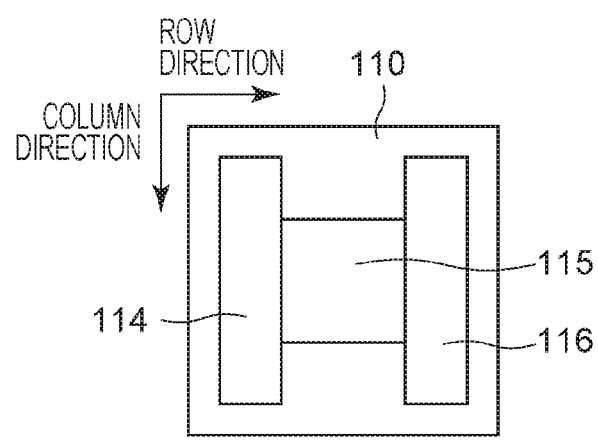
FIG. 1D is a functional block diagram of the imaging apparatus and the imaging device according to the embodiments.

A top view from the direction in which light is incident on the imaging device 102 is illustrated in FIG. 1B. The imaging device 102 includes multiple pixels 110 arranged in a matrix pattern in the row direction and the column direction, which are orthogonal to each other. A cross-sectional view of the pixel 110 is illustrated in FIG. 1C and a top view of the pixel 110 is illustrated in FIG. 1D. As a configuration, a micro lens 111, a color filter 112, a wiring portion 113, a photo-electric converter 114, a photo-electric converter 115, and a photo-electric converter 116 are arranged from the light incident side. The photo-electric converter 114, the photo-electric converter 115, and the photo-electric converter 116 are formed on an Si substrate 117. The photo-electric converter 114, the photo-electric converter 115, and the photo-electric converter 116 are arranged so as to be lined up in the row direction and optically have substantially conjugate relationship with the exit pupil of the imaging optical system 101 via the micro lens 111. With this configuration, the optical image generated from light beams that have passed through different areas of the pupil of the imaging optical system 101 is capable of being acquired using the photo-electric converter 114, the photo-electric converter 115, and the photo-electric converter 116. In other words, the pixel signal output from each photo-electric converter has the parallax in the row direction and, thus, the distance information about the subject is capable of being acquired using the imaging plane phase difference method. The signal acquired by each of the photo-electric converters in the present embodiment corresponds to the distance detection signal. Referring to FIG. 1D, the length in the longitudinal direction of the photo-electric converter 115 is shorter than those of the remaining photo-electric converters. This effectively corresponds to decrease of the aperture diameter of the imaging optical system 101 and is for acquisition of an image having a deep depth. The length in the longitudinal direction of the photo-electric converter 115 may be the same as those of the remaining photo-electric converters.

In the calculation of the distance information in the distance measurement calculation unit 105 in the present embodiment, the output signals from the photo-electric converter 114 and the photo-electric converter 116 are used. This increases the spacing between the photo-electric converters, compared with a case in which the photo-electric converters are arranged so as to be adjacent to each other in the row direction, to lengthen the base line length. Accordingly, it is possible to perform the distance measurement with high accuracy. The signal from the photo-electric converter 115 may be used depending on the image height position and the respective conditions of the imaging optical system 101. The combination of the photo-electric converters that acquire the signals may be varied for each image acquisition.

The pixel 110 functions as a distance measurement pixel capable of acquiring the distance detection signal and, concurrently, also functions as an imaging pixel capable of acquiring the imaging signal. Specifically, in the generation of the captured image, the pixel 110 uses only the output signal from the photo-electric converter 115 or a signal resulting from addition of the outputs from the photo-electric converter 114, the photo-electric converter 115, and the photo-electric converter 116. An image having a deep depth of field is capable of being generated in the former case and the imaging signal having high sensitivity and high resolution is capable of being generated in the latter case. Performing the addition operation by an addition circuit provided in the imaging device 102 enables the signal amount output from the imaging device 102 to be reduced. In this case, the distance detection signal used in the distance measurement calculation unit 105 may be calculated from the imaging signal resulting from the addition. Each signal used in the generation of the captured image in the present embodiment corresponds to the imaging signal.

Figure 2:
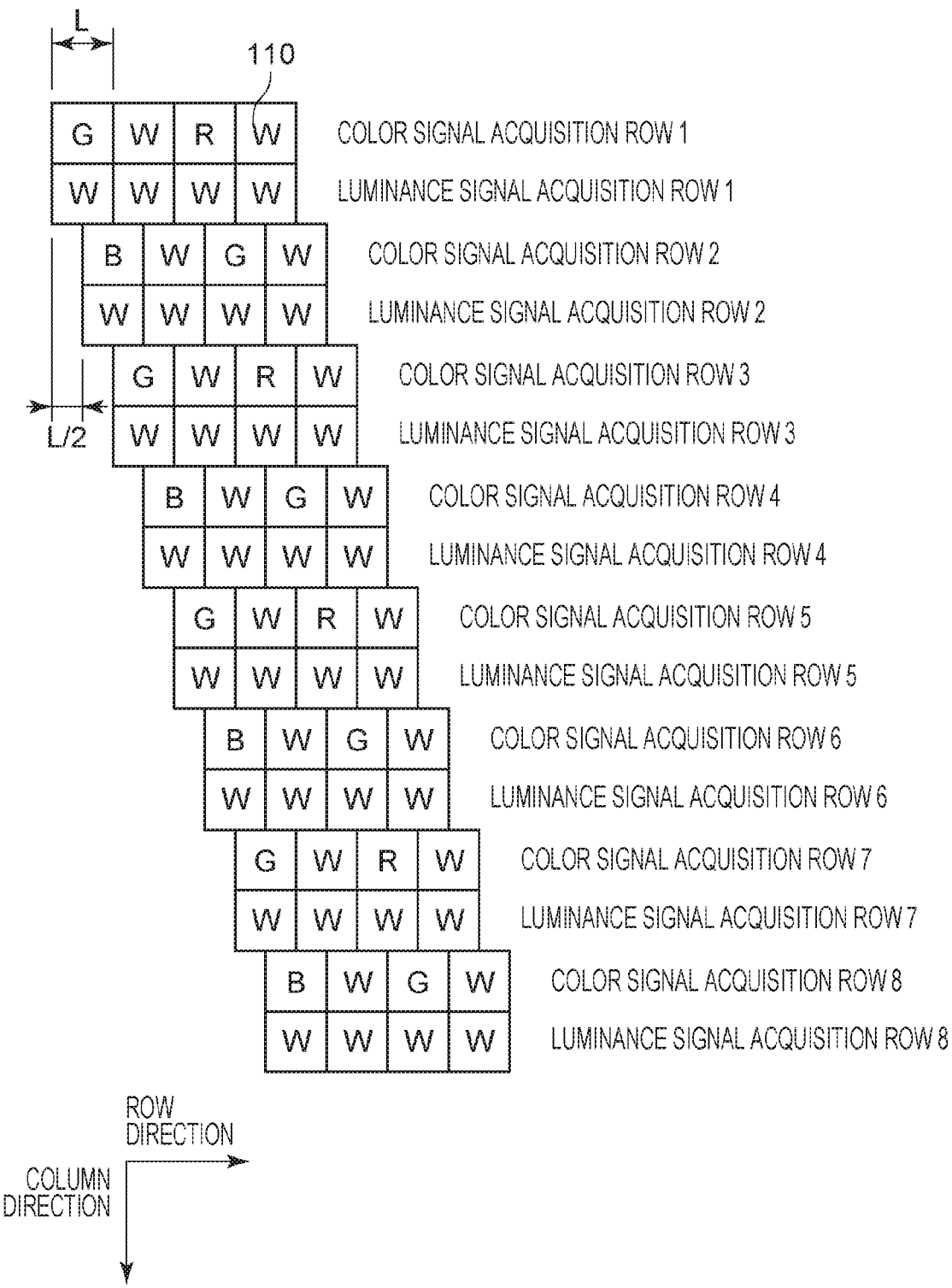
FIG. 2 is a diagram concerning the arrangement of color filters of the imaging device according to the embodiments.

Next, the array of the pixels 110, in particular, the array of color filters will be described in detail. An example of pixel array and color filter array in the imaging device according to the present invention is illustrated in FIG. 2. Color filters of multiple kinds are provided for the pixels 110. The pixels 110 are composed of color pixels provided with the color filters through which wavelength bands of specific colors are transmitted and white pixels W provided with the color filters through which all the wavelength bands are transmitted. The color pixels include green pixels G provided with the color filters through which the green wavelength band is transmitted, red pixels R provided with the color filters through which the red wavelength band is transmitted, and blue pixels B provided with the color filters through which the blue wavelength band is transmitted. As for the arrangement of the color pixels, one color pixel is adjacent to the white pixels W in all of the row direction, the column direction, and oblique directions in a plan view. Although the transmission wavelength band of the color filters of the white pixels W supposes a range of visible light, the transmission wavelength band is not limited to this and may include an infrared wavelength range. In addition, the color filters of colors other than RGB may be provided as the color pixels. For example, different wavelength bands G1 and G2 may be provided as different green wavelength bands.

The pixels 110 of the present embodiment are arranged so as to be shifted in the row direction for every two rows. As an example, when the width in the row direction of the pixels 110 is denoted by L in the arrangement illustrated in FIG. 2, the amount of shift is L/2. Accordingly, the imaging device 102 is capable of doubling the sampling period in the row direction of the optical image formed on the imaging device, compared with a case in which the pixels are arranged without shift. Consequently, it is possible to double the detection resolution of the parallax while keeping the large pixel size. In addition, it is possible to achieve the distance measurement with both high sensitivity and high accuracy. In particular, arranging the pixels so as to be shifted for every two rows facilitates sharing of a pixel circuit, such as a transistor, between the multiple pixels in the column direction to simplify the circuit and increase an aperture ratio. Arranging the pixels so as to be shifted for every two rows also has advantages of low noise, low power consumption, and high sensitivity. The color filters of four columns per cycle are arrayed in the row direction. This enables the pixels of the color filters, such as the white pixels W, having the wide transmission wavelength band to be uniformly arranged to achieve high sensitivity and high resolution, compared with the case of a common Bayer pattern in which the pixels of two columns per cycle are arranged.

The color filters of four columns and 16 rows per cycle illustrated in FIG. 2 are repeatedly arranged in the row direction and the column direction. The reason why arranging the color filters in the above manner generates a higher quality image will be described in detail below. The array illustrated in FIG. 2 is part of the array included in the imaging device 102 and the imaging device 102 of the present embodiment has the pixel array that is repeated with the periodicity illustrated in FIG. 2. Here, one cycle is described in detail, taking the arrangement in FIG. 2 as an example. Focusing on the R pixel in the first row in the array in FIG. 2, the color filter of the same color in the same column in the column direction is arranged in the pixel 16 rows below or above the R pixel in the first row. In other words, the color filter of the same color is not arranged within one cycle above or below the pixel in which a certain color filter is arranged. The same applies to the column direction.

Figure 3A:
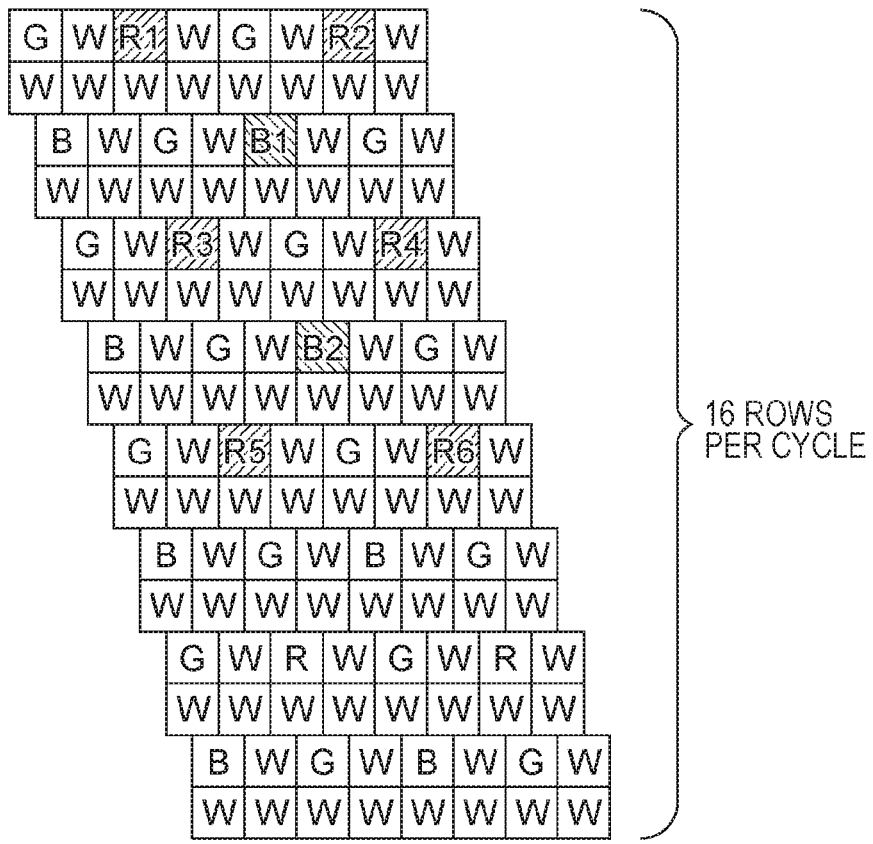
FIG. 3A is a diagram concerning the arrangement of the color filters of the imaging device according to the embodiments.
Figure 3B:
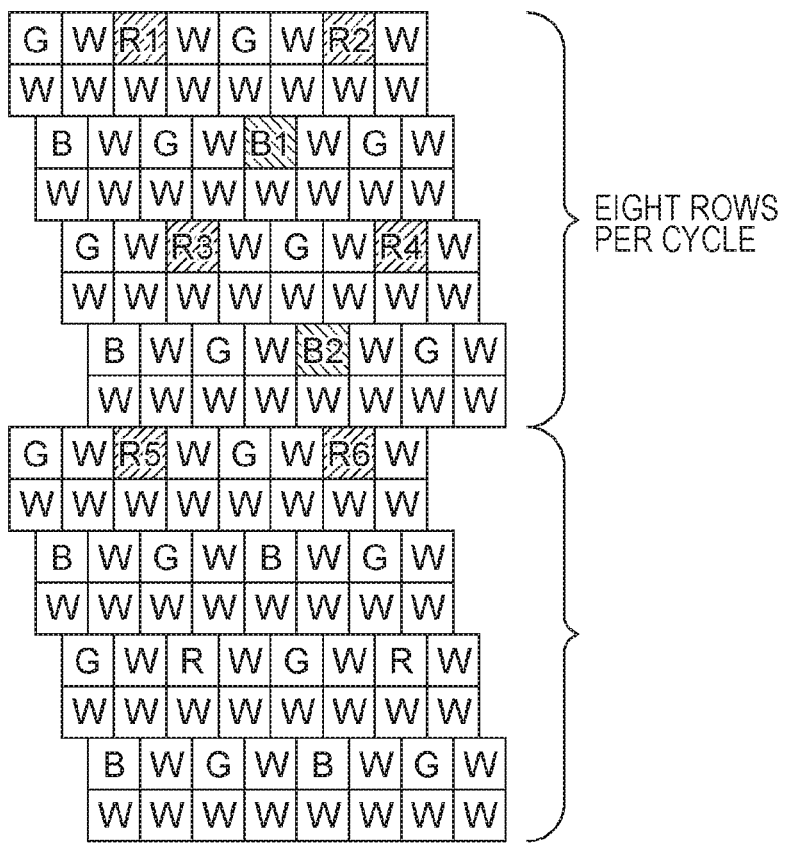
FIG. 3B is a diagram concerning the arrangement of the color filters of the imaging device according to the embodiments.

A state in which two cycles of the color filter unit illustrated in FIG. 2 are arrayed in the row direction is illustrated in FIG. 3A. In contrast, a state in which two cycles in the row direction and two cycles in the column direction of the color filters are arrayed is illustrated in FIG. 3B, as a different method of arraying the color filters. Here, four columns and eight rows compose one cycle. The development for generating the captured image in the image processing unit 104 based on the imaging signal supplied from the imaging device 102 of the present embodiment includes the interpolation process. As illustrated in FIG. 2, the color filter through which only the light of a certain wavelength band is transmitted is arranged for each pixel. Accordingly, the components based on the light in different bands are acquired from adjacent pixels using the interpolation process.

The interpolation process to interpolate the red signal component at the position of the blue pixel B from surrounding pixel signals will now be considered here. In the examples illustrated in FIG. 3A and FIG. 3B, the red signal component at the position of a blue pixel B1 is calculated through simple average or weighted average of the outputs from four pixels: surrounding red pixels R1 to R4 as the interpolation process. Similarly, the red signal component at the position of a blue pixel B2 is calculated through the simple average or the weighted average of the outputs from four pixels: surrounding red pixels R3 to R6. Here, in the color filter array illustrated in FIG. 3A, the blue pixel B1 and the blue pixel B2 have the same positional relationship with the surrounding red pixels R.

However, in the color filter array illustrated in FIG. 3B, the blue pixel B1 differs from the blue pixel B2 in the positional relationship with the surrounding red pixels R. In addition, the blue pixel B2 in FIG. 3B is shifted from the centroid position of the surrounding red pixels R3 to R6. Accordingly, since the positional relationship and the centroid position of the pixels used in the interpolation are shifted in the interpolation process of the color signal of the pixel, color unevenness occurs in an area where the same color should be output and/or color stain occurs in the boundary of the subject. In other words, with the color filter array according to the present invention, illustrated in FIG. 3A, it is possible to improve the periodicity of the pixel array and the periodicity of the color array to generate the captured image having high color reproduction and high quality.

In the present embodiment, as illustrated in FIG. 2, in the pixel array of the imaging device 102 of the present embodiment, luminance signal acquisition rows (luminance signal rows) are arrayed in the column direction, in which only the pixels that acquire luminance signals, such as the white pixels W and the green pixels G, are arranged. In addition, color signal acquisition rows (color signal rows) are also arrayed in the column direction, in which the pixels that acquire the luminance signals and the pixels that also include the color pixels, such as the red pixels and the blue pixels, and that acquire the luminance signals and the color signals are arranged. Providing the pixel rows that acquire only the luminance signals in the above manner enables the luminance signals to be acquired in the plane with high density to realize the image acquisition with high resolution and high quality. In addition, alternately arranging the luminance signal acquisition rows and the color signal acquisition rows enables the luminance signals and the color signals to be acquired with high density to achieve both the high resolution and the high color reproduction. In particular, configuring the pixels that acquire the luminance signals with the white pixels W and arranging the color pixels: the green pixels, the blue pixels, and the red pixels in the color signal acquisition rows enable the image acquisition with high sensitivity, high resolution, and high color reproduction. Arranging the respective color pixels so as to be surrounded by the white pixels W, as illustrated in FIG. 2, enables the image acquisition with higher sensitivity, higher resolution, and higher color reproduction.

Figure 5A:
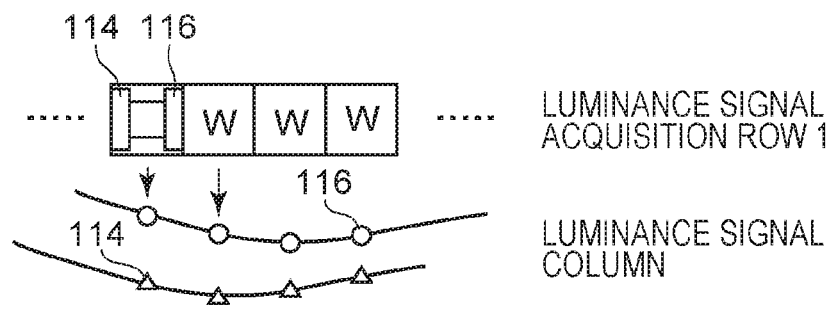
FIG. 5A is a diagram concerning a distance detection signal according to the embodiment.

Next, a method of generating the distance detection signal used in distance measurement calculation will now be described in detail with reference to FIG. 5. A luminance signal column for each parallax is created for each row in FIG. 2. Here, in the luminance signal acquisition row, the luminance signal column for each parallax corresponds to the output signal column from the photo-electric converter 114 and the output signal column from the photo-electric converter 116 of each pixel illustrated in FIG. 5A. Although the same applies to the color signal acquisition row, it is necessary to acquire the luminance signals corresponding to the color signal acquisition pixels, such as the red pixels and the blue pixels. Specifically, the luminance signal column for each parallax is created through the interpolation using the luminance signals of the luminance signal acquisition pixels, such as adjacent white pixels W and green pixels G.

Figure 5B:
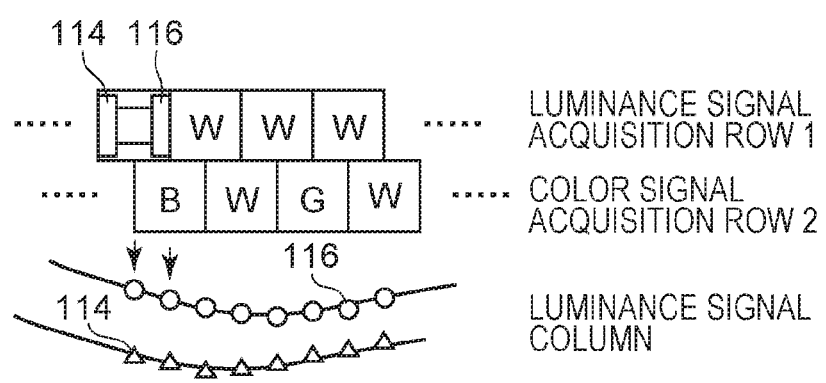
FIG. 5B is a diagram concerning the distance detection signal according to the embodiment.

Then, the luminance signal columns the positions of which are shifted in the row direction are combined to create a high-resolution luminance signal column having a spatial resolution twice the pixel array cycle. Specifically, the luminance signals of a luminance signal acquisition row 1 and the luminance signals of a color signal acquisition row 2 are alternately arranged in the row direction, as illustrated in FIG. 5B, to create a high-resolution luminance signal column 1. Similarly, a high-resolution luminance signal column 2 is created from the luminance signals of a luminance signal acquisition row 2 and the luminance signals of a color signal acquisition row 3. The high-resolution luminance signal columns are similarly created for the other rows. Then, the parallax is calculated using the high-resolution luminance signal column calculated for each parallax using a known method, such as correlation calculation between parallax signals. At this time, arranging the pixels on which the creation of the high-resolution luminance signal columns is based so as to be shifted in the above manner enables the image to be more accurately generated with the resolution half the pixel size. Accordingly, the parallax is capable of being calculated to achieve the distance measurement with high accuracy. Since the amount of data to be calculated is increased when the high-resolution luminance signal column is used, the calculation load may be increased. In such a case, a temporary parallax may be calculated before the creation of the high-resolution luminance signal column and the range of calculation in the high-resolution luminance signal column may be limited using the calculated temporary parallax.

The high-resolution luminance signal column may be created based on only the output signals from the luminance signal acquisition rows. Specifically, the luminance signals of the luminance signal acquisition row 1 and the luminance signals of the luminance signal acquisition row 2 are alternately arranged to create the high-resolution luminance signal column 1. Similarly, the high-resolution luminance signal column 2 is created from the luminance signals of the luminance signal acquisition row 2 and the luminance signals of a luminance signal acquisition row 3 or from the luminance signals of the luminance signal acquisition row 3 and the luminance signals of a luminance signal acquisition row 4. This makes, for example, the interpolation process to create the luminance signal column of the color signal acquisition rows unnecessary to enable the distance measurement with high accuracy using a small amount of calculation. Although the example is described in which the parallax is calculated after the high-resolution luminance signal column is created from the signals of the multiple rows, the calculation of the parallax is not limited to the above one. The parallax may be calculated before the high-resolution luminance signal column is created and the high-resolution parallax may be calculated based on the calculated parallax.

Here, when the high-resolution luminance signal column used in the distance measurement calculation is created based on only the output signals from the luminance signal acquisition rows, the pixel signals of the color signal acquisition rows are used only for the generation of the captured image. Accordingly, only the output signal from the photo-electric converter 115 or only the signal resulting from addition of the outputs from the photo-electric converter 114, the photo-electric converter 115, and the photo-electric converter 116 may be read out from the distance measurement pixels arranged in the color signal acquisition rows. This reduces the amount of data to be read out and to be transferred to increase the speed of the driving of the imaging device and reduce the power consumption in the driving of the imaging device. In addition, since the circuits for the read-out and the transfer are capable of being reduced, the aperture ratio is increased to increase the sensitivity. Furthermore, an image having a deep depth of field is capable of being generated in the former case and an image having high sensitivity and high resolution is capable of being generated in the latter case.

As described above, according to the present invention, it is possible to improve the periodicity of the pixel array and the periodicity of the color filter array to generate the distance information having high sensitivity and high accuracy and the image having high quality also when the pixels are arranged so as to be shifted by an amount corresponding to a half of the pixel.

Figure 4A:
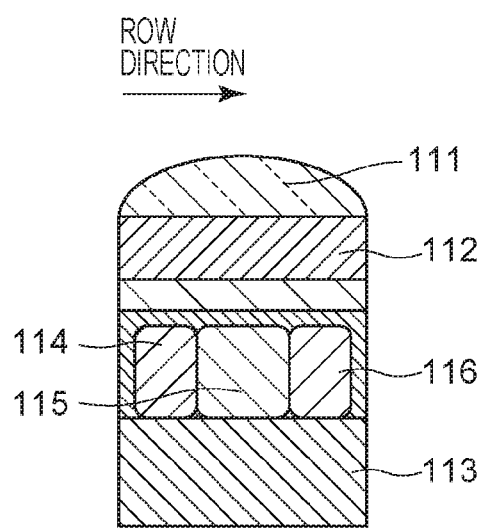
FIG. 4A is a diagram concerning the pixel structure of the imaging device according to the embodiments.
Figure 4B:
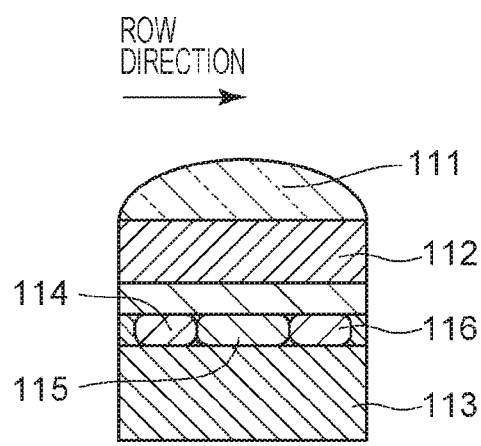
FIG. 4B is a diagram concerning the pixel structure of the imaging device according to the embodiments.

Although the pixels of a front face irradiation type, each of which includes the wiring portion 113 at the light incident side of the photo-electric converter 114, the photo-electric converter 115, and the photo-electric converter 116, are used in the present embodiment, as illustrated in FIG. 1C, the pixels are not limited to this type. Use of a pixel structure of a rear face irradiation type, in which the wiring portion 113 is provided at the opposite side of the light incident side, as illustrated in FIG. 4A, enables optical loss caused by diffusion in the wiring portion and a reduction in the aperture ratio in the photo-electric converters to be suppressed to improve the use efficiency of light, thereby enabling the image acquisition with high sensitivity. As illustrated in FIG. 4B, the Si substrate is not used and photo-electric conversion films made of an organic material or an inorganic material may be used as the photo-electric converter 114, the photo-electric converter 115, and the photo-electric converter 116. The use of the photo-electric conversion films forms the very thin photo-electric converters, suppresses crosstalk between the adjacent photo-electric converters in the same pixel and between the adjacent pixels, and achieves both the high distance measurement accuracy, and the high quality and the high sensitivity.

Figure 4C:
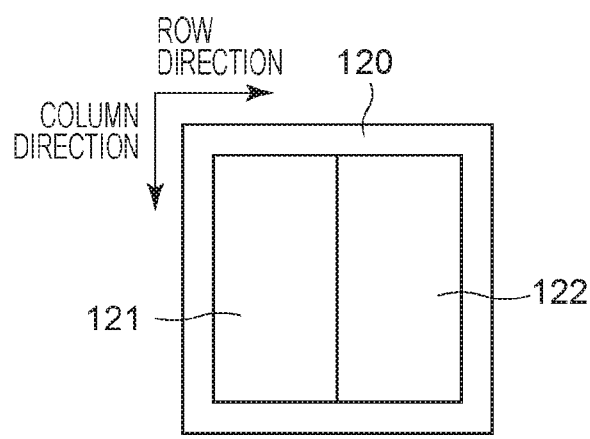
FIG. 4C is a diagram concerning the pixel structure of the imaging device according to the embodiments.
Figure 4D:
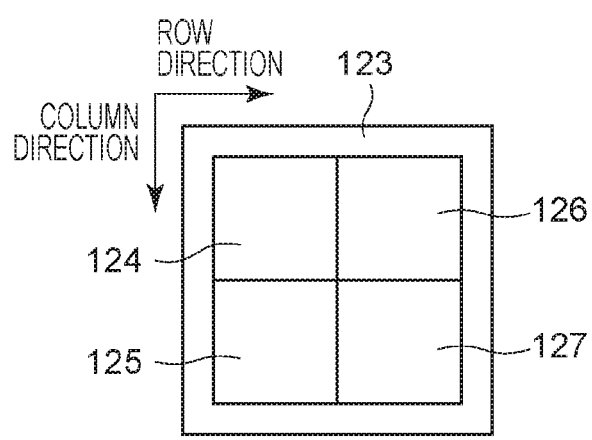
FIG. 4D is a diagram concerning the pixel structure of the imaging device according to the embodiments.

The pixel may be composed of two photo-electric converters: a photo-electric converter 121 and a photo-electric converter 122, which are arranged so as to be adjacent to each other in the row direction, as in a pixel 120 illustrated in FIG. 4C. In this case, the sensitivity is increased, compared with the case in which the three photo-electric converters are used. At this time, the output signal from any photo-electric converter or the signal resulting from addition of the outputs from both of the photo-electric converters is used for the generation of the captured image. Alternatively, the pixel may be composed of four photo-electric converters: a photo-electric converter 124, a photo-electric converter 125, a photo-electric converter 126, and a photo-electric converter 127 which are arranged so as to be adjacent to each other in the row direction and the column direction, as in a pixel 123 illustrated in FIG. 4D. In this case, the parallax image in the column direction is also capable of being acquired. For example, the parallax image in the column direction is capable of being acquired from the signal resulting from addition of the outputs from the photo-electric converter 124 and the photo-electric converter 126 and the signal resulting from addition of the outputs from the photo-electric converter 125 and the photo-electric converter 127. This enables the distance measurement accuracy of a subject having a large variation in contrast in the column direction to be improved.

The pixels in the imaging device may not necessarily have the same structure, and the pixels of different structures including the distance measurement pixels, such as the pixel 110, the pixel 120, and the pixel 123, and the normal pixels each including one photo-electric converter may be mixed in the pixels in the imaging device. Since the pixels in the imaging device desirably have the same structure because of suppression of the variation in characteristics of each pixel, the distance measurement pixels are used for all the pixels 110 in the imaging device 102 in the present embodiment. When the pixels of different structures are mixed, the imaging device control unit 103 is preferably provided in one package with the imaging device 102 in the laminated structure. This supports complicated driving to reduce the load on the control unit 106.

Second Embodiment

The example is described in the first embodiment in which the pixels are arranged at positions shifted in the row direction for every two rows by an amount corresponding to approximately a half of the pixel and the color filters of four columns per cycle in the row direction and 16 rows per cycle in the column direction are arranged. The present invention is not limited to this and, when M and N denote integers not smaller than one, configuring the imaging device in the color filter array described below enables the distance information having high sensitivity and high accuracy and the image having high quality to be generated in the same manner. When the pixels are arranged at positions shifted in the row direction for every M-number rows by the amount corresponding to a half of the pixel and the color filters are arranged in the row direction in an array of N-number columns per cycle, the color filters are arranged in the column direction in an array of 2MN-number rows per cycle. It is necessary to shift the pixels 2N-number times in order to shift the pixels arranged on a cycle of N-number columns by the amount corresponding to a half of the pixel per cycle. Since one shift is performed on a cycle of M-number rows, it is sufficient for the color filters to be arranged in an array of 2MN-number rows per cycle in order to keep the periodicity.

Figure 6A:
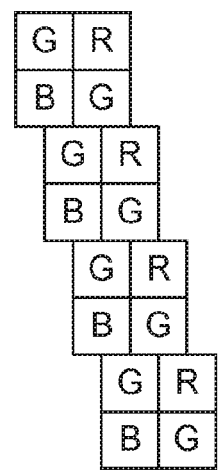
FIG. 6A is a diagram concerning the arrangement of the color filters in an imaging device according to a second embodiment.
Figure 6B:
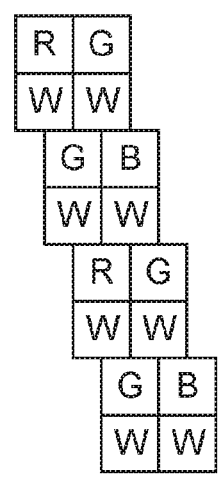
FIG. 6B is a diagram concerning the arrangement of the color filters in the imaging device according to the second embodiment.
Figures 6C, 6D:
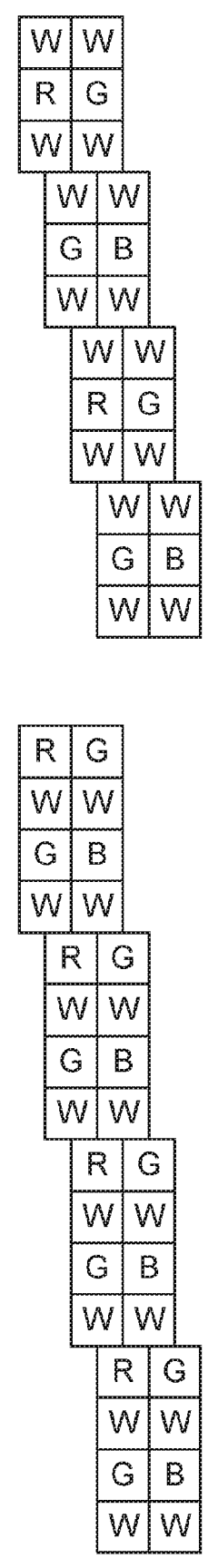

The color filter arrays according to the present invention, which are different from that in FIG. 2, will now be described with reference to FIG. 6 and FIG. 7. FIG. 6A and FIG. 6B correspond to cases when M=2 and N=2 and illustrate the color filter arrays of eight rows per cycle. The color filter array in FIG. 6A is composed of only the color signal acquisition rows that acquire the luminance signals and the color signals and is composed of the color pixels R, G, and B each having the color filter of any color, among red, green, and blue, arranged therein. The color filter array in FIG. 6B has a configuration in which the luminance signal acquisition rows having the white pixels W arranged therein and the color signal acquisition rows having the color pixels R, G, and B arranged therein are alternately arranged. FIG. 6C corresponds to a case when M=3 and N=2 and illustrates the color filter array of 12 rows per cycle. The color filter array in FIG. 6C has a configuration in which the luminance signal acquisition rows having the white pixels W arranged therein and the color signal acquisition rows having the color pixels R, G, and B arranged therein are arranged. Using the two luminance signal acquisition rows and arranging the adjacent luminance signal acquisition rows so as to be shifted in the row direction by the amount corresponding to a half of the pixel facilitate the creation of the high-resolution luminance signal column. FIG. 6D corresponds to a case when M=4 and N=2 and illustrates the color filter array of 16 rows per cycle. As in FIG. 6B, the color filter array in FIG. 6D has a configuration in which the luminance signal acquisition rows having the white pixels W arranged therein and the color signal acquisition rows having the color pixels R, G, and B arranged therein are alternately arranged.

Figure 7A:
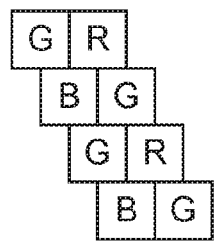
FIG. 7A is a diagram concerning the arrangement of the color filters in the imaging device according to the second embodiment.
Figure 7B:
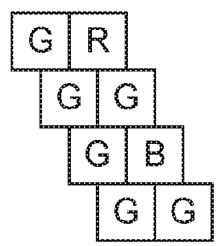
FIG. 7B is a diagram concerning the arrangement of the color filters in the imaging device according to the second embodiment.
Figure 7C:
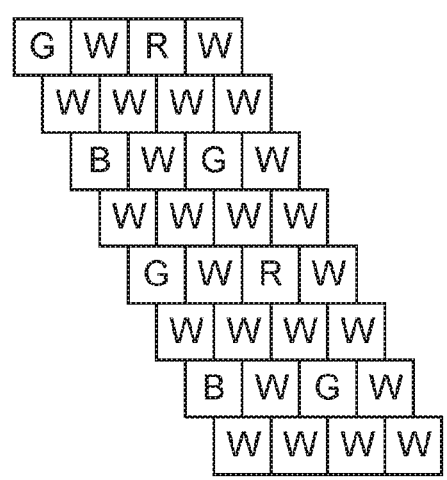
FIG. 7C is a diagram concerning the arrangement of the color filters in the imaging device according to the second embodiment.

FIG. 7 corresponds to cases when M=1. FIG. 7A and FIG. 7B correspond to cases when M=1 and N=2 and illustrate the color filter arrays of four rows per cycle. The color filter array in FIG. 7A is composed of only the color signal acquisition rows that acquire the luminance signals and the color signals and is composed of the color pixels R, G, and B each having the color filter of any color, among red, green, and blue, arranged therein. The color filter array in FIG. 7B has a configuration in which the luminance signal acquisition rows having the green pixels G arranged therein and the color signal acquisition rows having the color pixels R, G, and B arranged therein are alternately arranged. FIG. 7C corresponds to a case when M=1 and N=4 and illustrates the color filter array of eight rows per one cycle. As in the case in FIG. 2, the color filter array in FIG. 7C has a configuration in which the luminance signal acquisition rows having the white pixels W arranged therein and the color signal acquisition rows having the color pixels R, G, and B and the white pixels W arranged therein are alternately arranged.

In all the cases illustrated in FIG. 6 and FIG. 7, it is possible to improve the periodicity of the pixel array and the periodicity of the color array to generate the distance information having high sensitivity and high accuracy and the image having high quality.

The color pixels that acquire the color signals are not limited to the color filters of primary colors and may be filters of complementary colors, such as cyan and yellow. In this case, the transmission wavelength band of the color filters is widened to enable the image acquisition with high sensitivity. In addition, the amount of shift is not limited to the amount corresponding to a half of the pixel. For example, the amount of shift may be an amount corresponding to one third of the pixel or one fourth of the pixel. In this case, when the amount of shift is set to an amount corresponding to one Q-th of the pixel, arranging the color filters in an array of Q×MN-number rows per cycle in the column direction achieves similar advantages.

Although the examples of the pixel array are described in the first embodiment and the second embodiment, one kind of the pixel array may not necessarily be used in the imaging device 102. For example, the common amount of shift may be used and the pixel array (the array of the color filters) may be differentiated between the portions near the center of the imaging device 102 and the portions near the periphery of the imaging device 102. Alternatively, arrangement may be adopted in which multiple arrays described in the first embodiment and the second embodiment are combined.

Third Embodiment

Figure 8A:
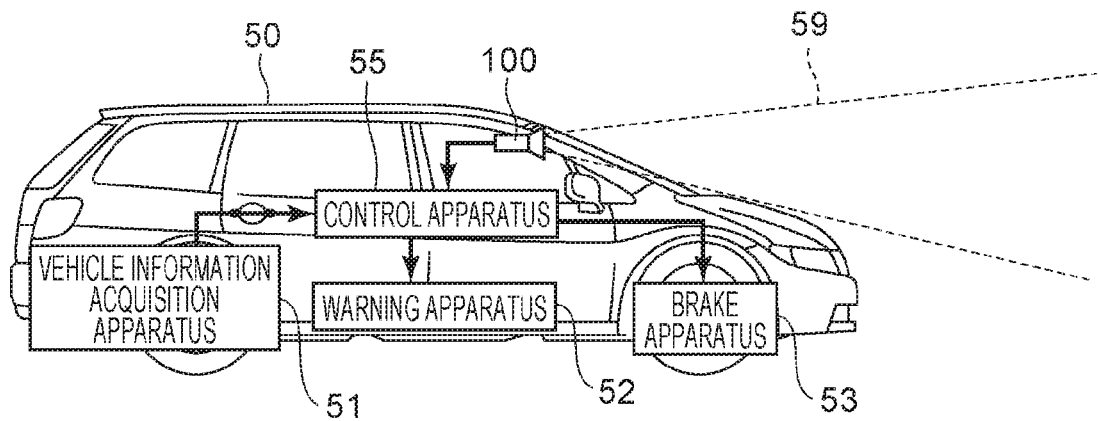
FIG. 8A is a block diagram when an imaging apparatus according to a third embodiment is used in a movable body and is a diagram illustrating an example of the operation of the imaging apparatus.

Next, a system configuration when the imaging apparatus is installed in a movable body will now be described. FIG. 8A is a diagram illustrating an example of the system configuration when the imaging apparatus 100 is installed in an automobile 50, which is an example of the movable body. The imaging apparatus 100 is mounted in, for example, an upper portion inside the front glass of the automobile 50 to capture an image in front of the automobile 50 at a certain angle-of-view 59. Then, the imaging apparatus 100 performs subject recognition to the captured image, as described above, detects various objects (for example, passers and vehicles) appearing in the front side (in the traveling direction), and performs the distance measurement of the detected objects. The control unit 106 in the imaging apparatus 100 supplies the captured image (including the image information) and the distance measurement information to a control apparatus 55 in the automobile 50. In the present embodiment, the imaging apparatus 100 may be configured so as not to include the distance measurement calculation unit 105. In this case, the imaging apparatus 100 may supply the distance detection signal to the control apparatus 55, where the distance measurement calculation may be performed.

The automobile 50 includes the control apparatus 55, a vehicle information acquisition apparatus 51, a warning apparatus 52, and a brake apparatus 53. The vehicle information acquisition apparatus 51 senses at least one piece of dynamic information about the automobile 50, such as the vehicle speed (the moving speed), the yaw rate, the rudder angle (the moving direction), the rotation speed of an engine, and the gear shift, as vehicle information and supplies the sensed vehicle information to the control apparatus 55. The warning apparatus 52, for example, sounds an alarm, displays warning information on the screen of a car navigation system or the like, or gives vibration to the seat belt or the steering in accordance with an instruction from the control apparatus 55 to give a user a warning. The brake apparatus 53 performs various operations including control of the rotation speed of the engine, gear shift control, brake assistance (for example, anti-lock braking system (ABS), electronic stability control (ESC), and automatic brake), and handling assistance (for example, automatic following and lane departure prevention) in accordance with an instruction from the control apparatus 55.

The control apparatus 55 is a computer that controls the operations of the warning apparatus 52 and the brake apparatus 53 based on the vehicle information acquired from the vehicle information acquisition apparatus 51 and the distance information for a certain object, which is acquired from the imaging apparatus 100. In addition, the control apparatus 55 communicates with the control unit 106 in the imaging apparatus 100 to function as a host computer for the control unit 106. In other words, the control apparatus 55 instructs the control unit 106 to acquire the captured image and the distance information and to transmit the captured image and the distance information that are acquired to the control apparatus 55. The transmission instruction and the acquisition of the captured image and the distance information are performed at certain time intervals. The time interval may be varied based on the vehicle information acquired from the vehicle information acquisition apparatus 51. Even when no transmission instruction from the control apparatus 55 is issued, the control apparatus 55 may interrupt the control unit 106 in conjunction with a certain event to acquire the captured image and so on.

Figure 8B:
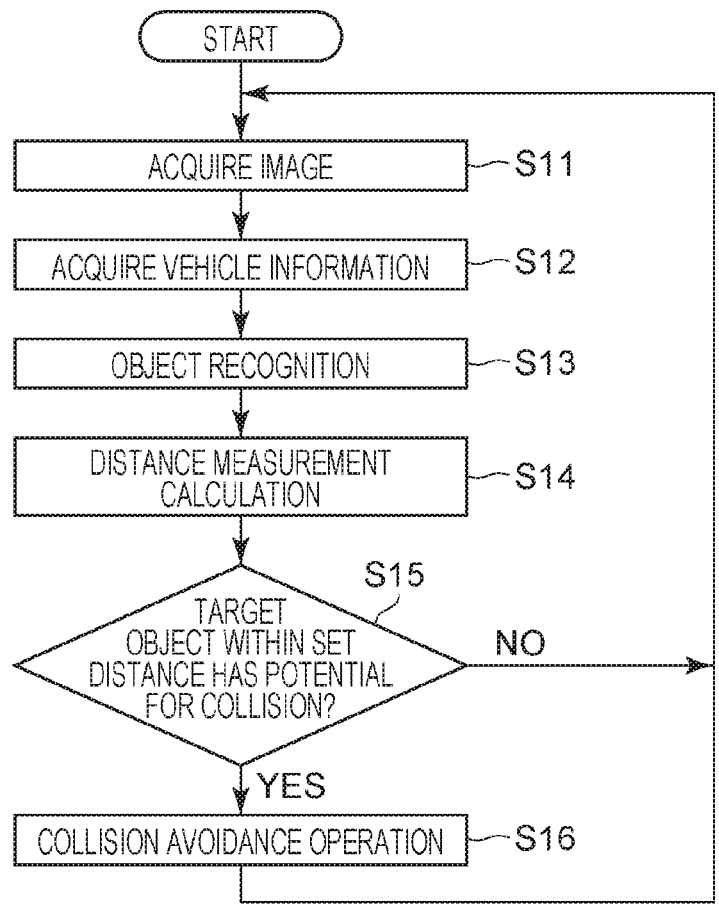
FIG. 8B is a block diagram when the imaging apparatus according to the third embodiment is used in the movable body and is a diagram illustrating an example of the operation of the imaging apparatus.

FIG. 8B is a flowchart of a collision avoidance control process, which is an example of operation control in the automobile 50. Among the steps in the flowchart in FIG. 8B, Step S11 and S13 to S14 are performed by the control unit 106 in the imaging apparatus 100 under the control of the control apparatus 55 in the automobile 50. Steps S12, S15, and S16 are performed by the control apparatus 55 in the automobile 50.

In Step S11, the imaging optical system 101 and the imaging device 102 performs image capturing, the image processing unit 104 generates the captured image, and the distance measurement calculation unit 105 generates the distance measurement information under the control of the control unit 106. Then, the process goes to the next step.

In Step S12, the control apparatus 55 acquires the vehicle information from the vehicle information acquisition apparatus 51. Then, the process goes to the next step.

In Step S13, the image processing unit 104 performs the subject recognition to the captured image based on the image information acquired in Step S11 under the control of the control unit 106. Specifically, the feature values, such as the amount and direction of edges, the density value, the color, and the luminance value, in the captured image are analyzed to detect, for example, a vehicle or a bicycle, a pedestrian, a traffic lane, a guard rail, or a brake lamp (hereinafter referred to as a "target object") in Step S13. The subject recognition may be performed to multiple frame images or part of the multiple frame images (at least one frame image). Then, the process goes to the next step.

In Step S14, the distance measurement calculation unit 105 calculates the distance information about the target object based on the distance measurement information acquired in Step S11 and the target object detected in Step S13 under the control of the control unit 106. Then, the process goes to the next step.

In Step S15, the control apparatus 55 determines whether the distance to the target object is within a predetermined set distance (whether the target object (=an obstacle) exists within the set distance) based on the distance information calculated in Step S14. If the target object exists within the set distance, the control apparatus 55 determines whether the target object within the set distance has a potential for collision based on the vehicle information (in particular, the moving speed and the moving direction) acquired in Step S12, the position of the target object, and the distance to the target object. In the case of the automobile 50 having a configuration capable of acquiring information about a road condition, the set distance may be varied depending on the road information (whether the road is dry or wet) (the set distance is increased if the road is wet) in Step S15.

If the control apparatus 55 determines that there is no potential for collision (NO in Step S15), the process goes back to Step S11. If the control apparatus 55 determines that there is a potential for collision (YES in Step S15), the process goes to Step S16.

In Step S16, the warning apparatus 52 and the brake apparatus 53 perform a collision avoidance operation under the control of the control apparatus 55. Although the collision avoidance operation includes the giving of the warning to a driver by the warning apparatus 52, the braking by the brake apparatus 53, movement to a low-speed gear, suppression of output from the engine, and so on, the collision avoidance operation is not limited to the above ones. After Step S16, the process goes back to Step S11. According to the operation illustrated in the above flowchart, it is possible to accurately sense the target object (obstacle) to avoid the collision or reduce the damage caused by the collision.

Step S12 and Steps S11, S13, and S14, which are a series of steps, may be performed in the above manner or may be concurrently performed. Step S13 and Step S14 may be performed in the opposite order. In this case, in Step S14, the distance measurement calculation unit 105 calculates the distance information for each pixel based on the parallax image acquired in Step S11 to generate a distance image (depth map) under the control of the control unit 106. Then, in Step S13, the image processing unit 104 detects the target object based on the captured image acquired in Step S11 and the distance image generated in Step S14 under the control of the control unit 106. Since the methods of calculating the amount of defocusing and the distance to the target object are known, a description of such methods is omitted herein.

The collision avoidance operation based on the image information and the distance information acquired by the imaging apparatus 100 is described here. However, the collision avoidance operation is not limited to this. Control of the automatic following to a leading vehicle, control of keeping driving at the center of a traffic lane, and control of preventing lane departure are different from the collision avoidance operation only in the determination criterion in Step S15 and are capable of being realized using methods similar to the method according to the flowchart in FIG. 8B.

Although the imaging apparatus 100 is loaded only at the front side of the automobile 50 in the system configuration of the automobile 50 described above, the imaging apparatus 100 may be mounted at a position at the back side of the vehicle where the image capturing is available and the image information and the distance information may be used in driving assistance when the automobile 50 is going backward. In addition, the image information and the distance information acquired by the imaging apparatus 100 are applicable not only to the diving assistance but also to autonomous driving. Furthermore, the imaging apparatus 100 is applicable not only to automobiles (including cars, trucks, buses, special-purpose vehicles, automatic motorcycles, and so on) but also to various movable bodies the operations of which are capable of being controlled based on the image information and the distance information, for example, ships and vessels, railroad vehicles, aircrafts (including drones), or industrial robots. In addition, the imaging apparatus 100 is not limitedly used for applications installed in the movable body and is also usable as a fixed-point camera. For example, the imaging apparatus 100 is applicable to systems, such as an intersection monitoring system and an intelligent transportation system (ITS), which widely use object recognition.

In the system configuration of the automobile 50, a configuration may be adopted in which the functions of the respective components other than the imaging optical system 101 and the imaging device 102 in the imaging apparatus 100 are given to the control apparatus 55 in the automobile 50. In other words, a system configuration in which the function of a control system is integrated with the function of the control apparatus 55 may be used as a configuration in which the optical system and the imaging device in the imaging apparatus 100 are separated from the control system in the imaging apparatus 100.

According to the present invention, it is possible to provide an imaging device and an imaging apparatus capable of acquiring high-sensitivity and high-accuracy distance information and high-quality image information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging device including a plurality of pixels arranged in a row direction and a column direction, which are orthogonal to each other,
    wherein the plurality of pixels includes distance measurement pixels each including a plurality of photo-electric converters arranged so as to be adjacent to each other in the row direction, and
    wherein, when M denotes an integer not smaller than one and N denotes an integer not smaller than two, the pixels are arranged at positions shifted in the row direction for every M-number rows by an amount corresponding to a half of the pixel, color filters are arranged in the row direction in an array of N-number columns per cycle, and the color filters are arranged in the column direction in an array of 2MN-number rows per cycle.

2. The imaging device according to claim 1,
    wherein M is an integer not smaller than two.

3. The imaging device according to claim 1,
    wherein N is an integer not smaller than four.

4. The imaging device according to claim 1,
    wherein the imaging device has luminance signal rows in which only the pixels that acquire luminance signals are arrayed and color signal rows in which the pixels that acquire the luminance signals and color signals are arrayed.

5. The imaging device according to claim 4,
    wherein the luminance signal rows and the color signal rows are alternately arranged.

6. The imaging device according to claim 4,
    wherein the pixels in the luminance signal rows are white pixels and the color signal rows include color pixels each having the color filter of any color, among red, green, and blue, arranged therein.

7. The imaging device according to claim 6,
    wherein the pixels in the color signal rows include the white pixels and each of the color pixels is adjacent to the white pixels in all of the row direction, the column direction, and oblique directions in a plan view.

8. The imaging device according to claim 1,
    wherein the distance measurement pixels each have three photo-electric converters arranged so as to be adjacent to each other in the row direction.

9. The imaging device according to claim 8,
    wherein each of the distance measurement pixels arranged in the color signal rows reads out only a signal from a center photo-electric converter, among the three photo-electric converters.

10. The imaging device according to claim 8,
    wherein each of the distance measurement pixels arranged in the color signal rows reads out a signal resulting from addition of the signals from the three photo-electric converters.

11. The imaging device according to claim 1,
    wherein all of the plurality of pixels are the distance measurement pixels.

12. The imaging device according to claim 1,
    wherein the photo-electric converters in the plurality of pixels are composed of photo-electric conversion films.

13. An imaging apparatus comprising:
    the imaging device according to claim 1;
    an imaging optical system that forms an optical image on the imaging device;
    image processing means for generating a captured image based on the signals output from the plurality of pixels of the imaging device; and
    distance measurement means for calculating distance information about a subject included in the captured image based on the signals output from the distance measurement pixels of the imaging device.

14. The imaging apparatus according to claim 13,
    wherein the distance measurement means performs distance measurement based on only the signals output from the distance measurement pixels arranged in the luminance signal rows.

15. A movable body comprising:
    the imaging apparatus according to claim 13; and
    control means for controlling the movable body based on the distance information calculated by the distance measurement means in the imaging apparatus.

16. The movable body according to claim 15, further comprising:
    information acquiring means for acquiring information about the movable body,
    wherein the control means controls a moving direction or a moving speed of the movable body based on the information about the movable body and the distance information.

17. The movable body according to claim 15,
    wherein, if it is determined that the movable body has a potential for collision with an obstacle, the control means controls the moving direction or the moving speed of the movable body.

* * * * *